United States Patent Office 3,684,467
Patented Aug. 15, 1972

3,684,467
TERPOLYMER BINDER COMPOSITION
Clayton A. Smucker, 506 Willrich Drive; William H. Rigby, Jr., 341 Woods Run Drive; and Wade V. Zellar, R.R. 3, Stillmeadow, all of Newark, Ohio 43055
No Drawing. Continuation-in-part of application Ser. No. 760,697, Sept. 18, 1968. This application Apr. 8, 1970, Ser. No. 26,777
Int. Cl. C03c 25/02; C08g 5/18, 9/32
U.S. Cl. 65—3       14 Claims

ABSTRACT OF THE DISCLOSURE

Siliceous fiber batts and the method of forming them wherein an improved resinous binder is employed, said binder being formed by the steps of (1) charging an initial mix of formaldehyde and phenol into a reactor in the presence of a catalyst, (2) reacting the mixture to a stage wherein some free formaldehyde remains, (3) charging the reactor sequentially with dicyandiamide, (4) reacting the dicyandiamide until a lesser amount of free formaldehyde remains, (5) charging urea to the reactor, (6) reacting the urea with the remaining free formaldehyde in the presence of the catalyst, (7) cooling the mixture, (8) neutralizing the mixture with acid, (9) and adding subsequently thereto, oil, silane, additional unreacted nitrogenous compounds and water.

This is a continuation-in-part of application Ser. No. 760,697, filed Sept. 18, 1968 and now abandoned.

BACKGROUND OF THE INVENTION

This invention relates to binders employed in the production of siliceous fiber batts and more specifically to the production of phenolic resins, which when combined with the conventional additives to form a binder, enhance the processing and physical properties of the bonded siliceous fiber batts.

U.S. Pats. 2,763,099; 3,019,477; and 3,337,669 are exemplary of how binders are combined with fibers to form an integral product. Specifically therein are graphic explanations of fiber formation, binder application, consolidation of the fibers into a loosely packed mass on a foraminous conveyor, and curing of the binder in situ on the fibrous mass. The binders of the present invention are applied with the apparatus shown.

The resinous binders used in the formation of batts must primarily be water dilutable, resistant to punking [1] and possess high application efficiency. Binders used heretofore, for this purpose, have included resins comprising a phenol formaldehyde partial condensation product, a phenol-melamine-formaldehyde partial condensation product, a phenol-urea-formaldehyde partial condensation product, and a phenol-dicyandiamide-formaldehyde partial condensation product. Particular problems are, however, present when some of the above resins are used as the bonding material in binders for the production of mats, batts, etc. Among these problems are low "punk" resistance, low application efficiency, non-uniform cure of the binder which results in "spots" of precured binder that decreases the tensile strengths of the batts, precure problems, processing odors, and environmental control problems (air and water pollution).

All of the above-mentioned problems are substantially diminished when the products are produced according to the concepts of our invention, hereinafter discussed in greater detail.

[1] The term "punking" as used herein, and in the art, refers to the comparatively rapid oxidation of the binder, with generation of heat, but without flame.

The present invention is based upon our discovery that particular partial condensation products comprising phenol formaldehyde, dicyandiamide formaldehyde, urea formaldehyde, and combinations thereof when used in the formulation of a binder composition for use with glass fibers, improve the punk resistance of the binder, improve the application efficiency of the binder to glass fibers, increase the bonding strength of the binder, improve the durability of the binder (i.e. greater resistance to swelling, etc.), increase the processing latitude (temperature, rates, etc.) of the binder, improve upon the uniformity of the cure and color of the cured binder, accelerate the cure rate and reduce odor and air and water pollution.

Among the advantages in using our resin as bonding material in a binder composition are: (1) a product is produced possessing better properties at a significant economic savings, (2) the free phenol content is lowered because of a higher mol ratio of formaldehyde to phenol in the initial phenol formaldehyde reaction, made possible by a subsequently controlled reaction of dicyandiamide and urea with formaldehyde, (3) dicyandiamide and urea tie up and substantially eliminate the free formaldehyde content of the system because of the controlled reactions, rather than depending totally upon a simple raw urea addition for reaction with formaldehyde, (4) flexibility in cure time of the product by the addition of raw urea to the binder composition, (5) improved application efficiency and durability, and (6) reduction of objectionable effluents from the binder applicating and binder curing zones.

It is therefore an object of the present invention to provide an improved terpolymer partial condensation composition, which when heated will proceed at a more uniform and faster cure rate during the manufacturing of the cured product.

It is another object of the invention to provide an improved article which is a mass of haphazardly arranged glass fibers bonded together at points of contact by a binder comprising an improved terpolymer partial condensation composition.

It is a further object of the invention to provide a method for producing a resin having an approximate formaldehyde to phenol mol ratio of from 2.9/1 to 3.5/1.

Other objects and advantages will be apparent from the description which follows, which is intended only to illustrate and disclose, and not to limit, the invention.

It has been discovered that by increasing the mol ratio of formaldehyde to phenol in the initial reaction and by charging dicyandiamide and raw urea to the same reactor wherein the initial reaction took place and reacting the dicyandiamide and urea under controlled conditions, many problems that have heretofore existed in the art have been minimized. By this method the dicyandiamide and urea react with excess formaldehyde from the initial reaction and proceed to the A stage. Moreover, the high mol ratio in the initial reaction allows the phenol to be more completely reacted with the formaldehyde, thereby reducing the amount of free phenol in the system to approximately 0.5 percent, whereas in a raw urea addition which is not reacted under controlled conditions, the free phenol content is more than 1.0 percent because of the lower initial mol ratio of formaldehyde to phenol therein. This difference in percentage of free phenol means that, on a large volume basis, environmental control problems are greatly reduced.

Instead of dicyandiamide and/or urea being simply added to form part of the binder composition and relying on heat in the curing ovens to react the dicyandiamide and/or urea with the formaldehyde, it has been discovered that higher application efficiencies and durability are obtained when dicyandiamide and urea are controllably reacted with the free formaldehyde of the system for from 15 minutes to about 3 hours at from 100° to about 150° F. after the dicyandiamide and urea have been added. The reaction temperatures, rates of addition, times of reaction, and concentration of constituents are critical because if the mixture is reacted outside of these ranges, the water dilutability and subsequent processing characteristics of the mixture are adversely affected. Furthermore, if the reaction is not carried out within these critical ranges, the desired higher average molecular weight polymers will not be formed. With this control in the dicyandiamide-formaldehyde and urea-formaldehyde part of the reaction, more formaldehyde is tied up thereby abating environmental control problems that existed heretofore. Prior to now a method used to introduce urea into the phenolic system was by a "cold cut" process, wherein all the urea was simply added to a holding tank containing the phenolic composition without being reacted under controlled conditions, and conventional compounds were then added to the holding tank to establish the final binder composition. There were some disadvantages however, among these are (1) lack of substantial reaction between the urea and formaldehyde, (2) "wet spots" on the finished batt product caused by poor process characteristics, (3) poor application efficiency of the binder to the batt product, and (4) free phenol, unreacted formaldehyde and urea went up the effluent stack and down the waste drain.

Another method for introducing nitrogenous compounds (including dicyandiamide, urea, and/or melamine) into a phenolic system is by a controlled reaction, wherein the entire nitrogenous compound addition is controllably reacted with the formaldehyde.

According to our invention, a method for producing an aqueous solution of a phenolic condensation product is provided. This method includes the steps of reacting phenol and an aldehyde in a reactor in the presence of a barium hydroxide catalyst to reduce the free formaldehyde of the mixture to a range from about 5.0 percent to about 10.0 percent, the reduction in free aldehyde being attributed to that which has reacted with the phenol, reacting subsequently therewith, dicyandiamide and urea which are charged to the same reactor over a time span of approximately 30 minutes to about 3 hours at from 100° to about 150° F., cooling the resultant mixture to 100° F. or lower, neutralizing said resultant mixture with a mineral acid, preferably dilute $H_2SO_4$ to adjust the pH to a range of from 6.5–7.5, and preferably from 7.1–7.3, and cooling to a maximum of 70° F. The conventional compounds of silane (0.1–1.0 percent on resin solids), lubricant (3.0–25.0 percent on resin solids), ammonium sulphate (0.2–3.0 percent on resin solids), and water (until desired binder solids of 1–40 percent is attained) plus the addition of a nitrogenous compound, including raw dicyandiamide, raw urea, and/or raw melamine in an amount of from 5–40 percent by weight based on the solids weight ratio of the condensation products, are added to make up the binder system, which has a water dilutability of at least 1000 percent. Vinsol, an extracted pinewood pitch, may be added to the binder composition for color matching and special processing characteristics.

The amount of raw dicyandiamide and/or raw urea added to make up the binder system is dependent upon the desried product density, degree of punk resistance, finished product properties, environment, and economics. It appears that these raw dicyandiamide, raw melamine, and raw urea additions may be made without significantly affecting cure rates and flow characteristics of the binder.

Varying amounts of an ammonium salt of a strong acid (ammonium sulfate, ammonium phosphate, ammonium sulfamate, ammonium chloride, etc.) provides flexibility in cure rates, maintains color stability and neutralizes residual alkali on the surfaces of glass fibers. Lubricants used in the binder compositions of our concept comprise a hydrocarbon oil emulsified in water. The preferred emulsifiers were found to be a 100 percent non-ionic octylphenoxypolyethoxyphenol, and a 60 percent concentrated anionic synthetic petroleum sulfonate, molecular weight of 450, cut in oil.

The mol ratio of formaldehyde to phenol determines proper cure time, wet tensile strength [2] or durability, and application efficiency. The controlled reaction of dicyandiamide and urea with the formaldehyde makes it possible to increase the mol ratio of formaldehyde to phenol, because with the controlled reaction there is more reaction of dicyandiamide and urea with the formaldehyde than there is with raw additions thereof to the binder composition. The combination of the higher mol ratio and the increased reaction between dicyandiamide and urea with formaldehyde improves the above properties, and provides improved punk resistance and uniform cure of the product, and greatly abates environmental control problems. Without the controlled reactions of dicyandiamide and urea with formaldehyde, the initial mol ratio of formaldehyde to phenol could not be employed thereby increasing the (residual) phenol content of the mixture. The dicyandiamide appears to impart good stability to the resin system and helps in the reproducibility of properties, from batch to batch. Dicyandiamide further enhances the punk resistance of products produced with this binder.

The amounts of dicyanidamide and urea that are charged to the reactor containing the initial reaction of formaldehyde and phenol is determined on the basis of the desired water dilutability of the finished resin and upon the desired wet tensile strength of a product formed by combining glass fibers and the resin.

When the final binder mixture is cured on the glass wool pack, formaldehyde and water are released from mono and dimethylolurea in the resin making up the binder, and additional water is released from methylol phenol therein, but the nitrogenous addition to the resin system in the binder holding tank acts as a scavenger or sponge to absorb the released formaldehyde and further reacts therewith. The above is proven by the high wet tensile strengths of the resin when combined with glass fibers, and the absence of formaldehyde fumes which is a function of the degree of reaction of the system. An ancillary benefit of having a nitrogenous compound in the binder system is that it further reduces the free formaldehyde content by reaction therewith during binder application and in the binder curing zones, thereby aiding environmental control.

Glass fibers are produced by flowing streams of molten glass through small orifices and drawing out the streams at speeds capable of attenuating said materials into fibers of desired diameters, associating a binder composition comprising polymeric partial condensation products with the fibers in a forming hood before they are projected onto a foraminous conveyor, projecting the fibers with the binder composition thereon onto the foraminous conveyor, and heating the mass of fibers and binder in ovens until the binder is converted, in situ, into a hardened, infusible condition.

Materials produced from the above method have found

---

[2] The measurement of tensile strengths (wet and dry) involves mixing 36.0 grams of 50 percent solids resin with 1.80 grams of 10 percent solids solution of ammonium sulfate. Then the pH of the mix is raised to 8.0 or above with ammonium hydroxide. To this mixture a mixture of 4.0 grams of water and 0.18 grams of a 10 percent silane solution made by Dow-Corning (Z–6024) is added thereto, and the rsuiting composition is mixed with 582.0 grams of clean, washed, small beads of soda-lime glass to produce a molding composition. The molding composition is moldesd into the form of a "dogbone mold" by preheating the mold to 425° F. and curing therein for 7 minutes at 425° F. After cure and separation from the mold, the dogbones that are produced are tested for wet tensile strength, by placing the dogbone in a relative humidity cabinet at 100 percent relative humidity, 50° C. for 16 hours, and dry tensile strength by leaving these samples exposed to room temperatures. After 16 hours the tensile strengths are determined on a Scott Tester or Instron unit. Preferably, the wet tensile strength values are 600 p.s.i. or better and the dry tensile strength values are 800 p.s.i. or better.

widespread commercial use in the thermal and acoustical markets and also in the decorative field. Examples of some of these products are ceiling board, acoustical tile, formboard, roof deck, duct, molded pipe insulation, appliance insulation, air filters, etc.

The heating of the pack or mass of fibers and associated binder is preferably accomplished through a series of oven zones, the first of which is approximately 50° F. lower in temperature than the rest of the zones in the oven. This lower temperature in the first zone is a safeguard against excess volatile loss of the binder on the wool pack. The compression of the pack establishes the density-thickness relationship of the product.

Our inorganic fiber products are formed by combining phenol, formaldehyde, dicyandiamide, and urea to form a terpolymer to which conventional materials making up a binder composition are added. To this binder composition, additional nitrogenous compounds are added in order to obtain flexibility in finished porduct properties necessary for different products, to accompany varying environmental conditions and to abate pollutants such as formaldehyde from emitting into the air. The binder composition with the additional nitrogenous compounds therein is then combined with glass fibers as they are formed from molten streams of glass. The nitrogenous addition to the binder composition is preferably made prior to the combining of the binder with the fibers in order to insure homogeneity, such as by making the addition to a binder holding tank or by introduction of the addition to the binder in a feed line to the spray nozzle or by introduction of the addition into the spray nozzle. However, the nitrogenous addition to the binder composition may be made simultaneously with the combining of the binder with the fibers, such as by introducing the addition from a separate orifice in the same spray nozzle as the binder composition or by introducing the addition from a separate spray nozzle. The glass fibers, while being directed toward a foraminous conveyor, are coated with the binder. Subsequently the glass fibers and binder composition are consolidated into a loosely packed mass on the foraminous conveyor and optionally compressed to obtain a desired density. Specific reference is made to the prior mentioned U.S. patents which show application of binder to glass fibers. Finally, the binder composition is cured in situ on glass fiber products.

A preferred method of making a bonded glass fiber product comprises forming glass fibers from molten streams of glass and combining the glass fibers with a heat curable aqueous binder composition having a water dilutability of at least 1000 percent. The binder composiposition may be made simultaneously with the combining tion comprises the combination of: (1) 60–95 percent by weight of a polymeric component comprising (a) 70–80 percent by weight of a phenol formaldehyde partial condensation component, (b) 5–15 percent by weight of a dicyandiamide formaldehyde partial condensation component, (c) 5–30 percent by weight of a urea formaldehyde partial condensation component, (d) mixtures of (a), (b) and (c), and (e) 5–40 percent by weight of an unreacted nitrogenous compound; (2) 0.5–25.0 percent by weight of a lubricant, based on the total weight of a lubricant, based on the total weight of the partial condensation and unreacted nitrogenous compound; (3) 0.1–1.0 percent by weight of a silane, based on the total weight of the partial condensation components and unreacted nitrogenous compound; (4) 0.2–3.0 percent by weight of an ammonium salt of a strong acid based on the total weight of the partial condensation components and unreacted nitrogenous compound; (5) water, to dilute the binder to a desired solids of from 1–40 percent. The combination of glass fibers and heat curable binder is consolidated into a loosely packed mass on a foraminous conveyor. The mass is optionally compressed to increase the density thereof and subsequently heat curable binder is cured in situ on the glass fibers to form the desired product.

The product formed by combining glass fibers and heat curable binder, after curing, is a bonded, randomly arranged structure wherein the cured binder comprises the combination of (a) 45–70 percent by weight of a phenol formaldehyde condensation component, (b) 3–7 percent by weight of a dicyandiamide formaldehyde condensation component, (c) 35–55 percent by weight of a urea formaldehyde condensation component, (d) mixtures of (a), (b), and (c), (e) 0.5–25.0 percent by weight of a lubricant based on the total weight of the condensation components, and (f) 0.1–1.0 percent by weight of a silane based on the total weight of the condensation components, wherein the product comprises from about 0.5 to about 25.0 percent by weight of the cured binder.

It must be pointed out that when a precure problem arises, it is usually because of gelation of the binder before the controlled curing process is started, and as a result the binder is hard and non-flowing and hence poorly bonded areas are formed. Therefore the amount of binder which is actually available for bonding is effectively reduced, thereby decreasing the quality of the bond. To alleviate the above situation by increasing the binder content on the batt to insure adequate bonding, the tendency to punk increases because punking is roughly proportional to binder content. However, because the subject binder has less tendency to precure, increasing the binder content is not required.

Our phenol, dicyandiamide, urea, formaldehyde system yields a 5–10 percent better application efficiency [3] than formerly attained. It is believed that this efficiency is achieved because the materials making up the resin have formed higher average molecular weight polymers, i.e. more di- and tri-methylol phenol is formed. Absence of low molecular weight polymers decrease volatile losses in the curing operation, and hence reduces effluents emitting from the curing oven stacks. Application efficiencies of binder to fiber are preferably 80 percent or better. U.S. Pat. 2,653,473 discloses an apparatus for the determination of application efficiency.

The wet tensile strength of the resultant resin when combined with glass fibers is increased by the addition of a silane thereto (0.1–1.0 percent on the resin solids). The preferred silane was found to be an amino silane having a molecular structure represented by the following: $H_2N-CH_2-CH_2-NH-CH_2-CH_2-Si(OC_2H_5)_3$. Although this silane is preferred, other organo silanes have been found to be satisfactory, e.g.:

gamma-aminopropyltriethoxysilane,
gamma-methacryloxypropyltrimethoxysilane,
gamma-glycidoxypropyltrimethoxysilane,
N-bis(beta-hydroxyethyl)gamma-aminopropyltriethoxysilane,
N-beta-(aminoethyl)-gamma-aminopropyltrimethoxysilane,
beta-(3,4-epoxycyclohexyl)-ethyltrimethoxysilane,
vinyltrichlorosilane,
vinyltriethoxysilane,
vinyltriacetoxysilane,
N-(dimethoxy methylsilylisobutyl)ethylenediamine,
methyltrimethoxysilane,
phenyltrimethoxysilane,
di-methyldimethoxysilane,
methylphenyldimethoxysilane,
diphenyldimethoxysilane,
gamma-chloropropyltrimethoxysilane,
trimethylmercaptotrimethoxysilane, and

---

[3] The term "application efficiency" or more correctly, cone efficiency, is used herein, and in the art, to refer to the amount of resin solids deposited into a cone by spraying resin into the cone, curing the resin therein and calculating the efficiency by the expression:

$$E = \frac{\text{weight of resin and cone} - \text{weight of cone}}{\text{sp. gr. of resin} \times \text{weight of resin solids}} \times 100$$

methyl-3-[3-(trimethoxysilylpropyl)-2-aminoethyl-amino] propionate.

It is believed that this particular silane, having two amine groups thereon, helps to give additional properties to the resin because not only is there compatibility between the glass fibers and the silane, but there is also coordination between the silane and the resin. Silane additions of 0.25 percent based on the resin solids have given optimum processing and economic results.

The catalyst or condensing agent used to produce the terpolymer condensation product includes the more commonly used alkali metal hydroxides and alkaline earth hydroxides. It is preferably to use a barium condensing agent, such as barium oxide, barium monohydrate or barium octahydrate, but sodium hydroxide or calcined hydroxide alone and in combination with a barium catalyst work well.

Great care is necessary in adjusting the pH of the final reaction mixture between the narrow range of 7.1 and 7.3. If the final reaction mixture falls below 7.1, storage stability of the resin is impaired. If the final reaction mixture goes above a pH of 7.3, this too will deleteriously affect the storage stability. Because heat is given off during the neutralization step, cooling of the reaction mixture to at least 100° F. is desired prior to the making of a pH adjustment with a mineral acid.

The following examples are presented solely for the purpose of further illustrating and disclosing the invention and are in no way to be construed as limitations thereon.

Example I

A formulation for the formation of our terpolymer partial condensation resole is as follows:

| Ingredients | Weight (lbs.) | Mols | Mol ratio |
|---|---|---|---|
| Formaldehyde (52% solids) | 520.0 | 9.01 | 3.1 |
| Phenol (USP grade) | 273.3 | 2.90 | 1.0 |
| Water | 81.0 | | |
| Barium monohydrate | 40.0 | | |
| Dicyandiamide | 27.3 | 0.33 | |
| Urea (100% solids) | 41.0 | 0.68 | |
| Sulfuric acid (66° Bé.) | 44.4 | | |

End point on the addition of acid is the final pH, not the total volume of acid added. Figures on the amount of acid to be added only serve as a guide.

Example II

Another formulation for the formation of our terpolymer partial condensation resole is as follows:

| Ingredients | Weight (lbs.) | Mols | Mol ratio |
|---|---|---|---|
| Formaldehyde (45%) | 180.5 | 2.70 | 3.1 |
| Phenol (100%) | 82.0 | 0.81 | 1.0 |
| Barium monohydrate (dry) | 11.2 | | |
| Dicyandiamide (dry) | 8.0 | 0.1 | |
| Urea | 12.0 | 0.2 | |
| Sulfuric acid (66° Bé.) | 12.3 | | |

End point on the addition of acid is the final pH, not the total volume of acid added. Figures on the amount of acid to be added only serve as a guide.

EXAMPLE III

| Ingredients | Weight (lbs.) | Mols | Mol ratio |
|---|---|---|---|
| Formaldehyde (45%) | 191.9 | 2.88 | 3.3 |
| Phenol (100%) | 82.0 | 0.87 | 1.0 |
| Barium monohydrate (dry) | 11.9 | | |
| Dicyandiamide (dry) | 8.2 | 0.1 | |
| Urea (dry) | 24.6 | 0.41 | |
| Sulfuric acid (66° Bé.) | 6.5 | | |

End point on the addition of acid is the final pH, not the total volume of acid added. Figures on the amount of acid to be added only serve as a guide.

A reactor is charged with phenol and formaldehyde; the reactor being equipped with a temperature controller, an agitator, and heating and cooling coils. The refractive index of the contents of the examples are adjusted to a range of from about 1.3300 to about 1.4400 with formaldehyde or phenol as necessary. Preferably, the refractive index of the reactor contents is adjusted to a range of from about 1.4365 to about 1.4375. The contents in the reactor are cooked at 100° F. for approximately 3 hours, during the first 2 hours of which barium monohydrate is added thereto. After the 3-hour cook, the temperature of the reactor contents is raised to 120° F. over approximately a 30 minute period, and held at 120° F. for an additional hour. Subsequently, the temperature of the reactor contents is raised to 140° F. over a 30 minute period and cooked for an additional 3 hours at 140° F. or until the free formaldehyde falls to 7.3 percent, whichever occurs first. Dicyandiamide is added to the reactor over a 30 minute period and cooked with the contents for an additional 30 minutes at 140° F. Subsequently, urea is added over a 30 minute period, during which time the reacted contents are cooled to 100° F. and neutralized with dilute sulfuric acid to a pH of from 7.1 to 7.3. Since the cooling step is not instantaneous, the urea has time to react with excess free formaldehyde to from a partial urea formaldehyde condensation component.

Various changes and modifications may be made from the details specifically set forth herein without departing from the spirit and scope of the attached claims.

We claim:

1. A method of preparing a bonded glass fiber product comprising the steps of:
   (a) forming glass fibers from molten streams of glass;
   (b) combining the glass fibers with a heat curable aqueous binder composition having a water dilutability of at least 1000 percent, said binder composition comprising
      (1) 60–95 percent by weight of a complex polymeric component formed by reacting phenol, formaldehyde, dicyandiamide, and urea, wherein said reacting comprises:
         (a) charging a reactor with a mixture of formaldehyde and phenol in a mol ratio of formaldehyde/phenol of from 2.9–3.5/1;
         (b) reacting the mixture in the presence of a condensing agent unit it has a free formaldehyde content of from 5.0–10.0 percent by weight of the total weight of formaldehyde and phenol and water;
         (c) adding to the reactor, dicyandiamide in a mol ratio of phenol/dicyandiamide of substantially 1.0/0.05–0.2, and wherein the mol ratio of free formaldehyde to dicyandiamide is from 5.0–10.1/1.0;
         (d) reacting the dicyandiamide and the mixture until the free formaldehyde content has been reduced to from 0.5 to 5.0 percent by weight of the total weight of formaldehyde, phenol, dicyandiamide and water;
         (e) adding urea to the reactor in an amount that the mol ratio of phenol/urea is 1.0/0.1–0.4, and wherein the mol ratio of free formaldehyde to urea is from 0.5–5.0/1;
         (f) reacting the urea and the mixture until the free formaldehyde content has been reduced to from 0.1–2.0 percent by weight of the total weight of formaldehyde, phenol, dicyandiamide, urea and water;
         (g) cooling the reactor contents comprising the polymeric component; and
         (h) neutralizing the reactor contents to stop the reactions short of completion;
      (2) 5–40 percent by weight of an unreacted nitrogenous compound capable of condensation with formaldehyde, said binder composition containing in addition,
(3) 0.5–25.0 percent by weight of a lubricant, based on the total weight of the complex polymeric component and the unreacted nitrogenous compound,
(4) 0.1–1.0 percent by weight of a silane, based on the total weight of the complex polymeric component and the unreacted nitrogenous compound,
(5) 0.2–3.0 percent by weight of an ammonium salt of a strong acid based on the total weight of the complex polymeric component and the unreacted nitrogeneous compound,
(6) water, to dilute the binder to a desired solids of from 1–40 percent,
(c) consolidating the fibers and heat curable aqueous binder composition into a loosely packed mass on a foraminous conveyor;
(d) compressing the consolidated fibers on the foraminous conveyor; and
(e) curing the heat curable binder composition in situ on the glass fiber product.

2. The method of claim 1 wherein the unreacted nitrogenous compound is selected from the group consisting of urea, melamine, dicyandiamide, and combinations thereof.

3. A product formed a glass fibers and a cured binder, wherein the glass fibers are bonded together by said cured binder in a random arrangement to form a substantially rigid structure and wherein the cured binder results from heating together on the glass fiber surfaces:
(1) 60–95 percent by weight of a complex polymeric component formed by reacting phenol, formaldehyde, dicyandiamide, and urea, wherein said reacting comprises:
(a) charging a reactor with a mixture of formaldehyde and phenol in a mol ratio of formaldehyde/phenol of from 2.9–3.5/1;
(b) reacting the mixture in the presence of a condensing agent until it has a free formaldehyde content of from 5.0–10.0 percent by weight of the total weight of formaldehyde and phenol and water;
(c) adding to the reactor, dicyandiamide in a mol ratio of phenol/dicyandiamide of substantially 1.0/0.05–0.2, and wherein the mol ratio of free formaldehyde to dicyandiamide is from 5.0–10.0/1.0;
(d) reacting the dicyandiamide and the mixture until the free formaldehyde content has been reduced to from 0.5 to 5.0 percent by weight of the total weight of formaldehyde, phenol, dicyandiamide and water;
(e) adding urea to the reactor in an amount that the mol ratio of phenol/urea is 1.0/0.1–0.4, and wherein the mol ratio of free formaldehyde to urea is from 0.5–5.0/1;
(f) reacting the urea and the mixture until the free formaldehyde content has been reduced to from 0.1–2.0 percent by weight of the total weight of formaldehyde, phenol, dicyandiamide, urea and water;
(g) cooling the reactor contents comprising the polymeric component; and
(h) neutralizing the reactor contents to stop the reactions short of completion.
(2) 5–40 percent by weight of an unreacted nitrogenous compound capable of condensation with formaldehyde, said binder containing in addition,
(3) 0.5–25.0 percent by weight of a lubricant, based on the total weight of the complex polymeric component and the unreacted nitrogenous compound,
(4) 0.1–1.0 percent by weight of a silane, based on the total weight of the complex polymeric component and the unreacted nitrogenous compound,
(5) 0.2–3.0 percent by weight of an ammonium salt of a strong acid based on the total weight of the complex polymeric component and the unreacted nitrogenous compound,
(6) water, to dilute the binder to a desired solids of from 1–40 percent,
wherein the amount of cured binder in the product is substantially 0.5–25.0 percent by weight based on the combined weight of glass fibers and binder.

4. The product of claim 3 wherein the unreacted nitrogenous compound is selected from the group consisting of urea, melamine, dicyandiamide and combinations thereof.

5. In a method of preparing a bonded inorganic fibrous product comprising associating a binder composition with glass fibers substantially immediately after the glass fibers are formed from molten streams of glass and curing the binder composition in situ on the glass fibers to form a bonded fibrous product, wherein the binder composition comprises a resinous material, lubricant, silane, ammonium salt of a strong acid and water, the improvement comprising having the resinous material formed by combining:
(1) 60–95 percent by weight of a complex polymeric component formed by reacting phenol, formaldehyde, dicyandiamide, and urea, wherein said reacting comprises:
(a) charging a reactor with a mixture of formaldehyde and phenol in a mol ratio of formaldehyde/phenol of from 2.9–3.5/1;
(b) reacting the mixture in the presence of a condensing agent until it has a free formaldehyde content of from 5.0–10.0 percent by weight of the total weight of formaldehyde and phenol and water;
(c) adding to the reactor, dicyandiamide in a mol ratio of phenol/dicyandiamide of substantially 1.0/0.05–0.2, and wherein the mol ratio of free formaldehyde to dicyandiamide is from 5.0–10.0/1.0;
(d) reacting the dicyandiamide and the mixture until the free formaldehyde content has been reduced to from 0.5 to 5.0 percent by weight of the total weight of formaldehyde, phenol, dicyandiamide and water;
(e) adding urea to the reactor in an amount that has the mol ratio of phenol/urea is 1.0/0.1–0.4, and wherein the mol ratio of free formaldehyde to urea is from 0.5–5.0/1;
(f) reacting the urea and the mixture until the free formaldehyde content has been reduced to from 0.1–2.0 percent by weight of the total weight of formaldehyde, phenol, dicyandiamide, urea and water;
(g) cooling the reactor contents;
(h) neutralizing the reactor contents to stop the reactions short of completion; and
(2) 5–40 percent by weight of an unreacted nitrogenous compound capable of condensation with formaldehyde to the binder composition.

6. The method as claimed in claim 5 wherein the unreacted nitrogenous compound is selected from the group consisting of urea, melamine, dicyandiamide and combinations thereof.

7. The method as claimed in claim 5 wherein the unreacted nitrogeneous compound is combined with the complex polymeric component prior to the combining of the binder composition with the glass fibers.

8. The method as claimed in claim 5 wherein the unreacted nitrogenous compound is combined with the complex polymeric component simultaneously with the combining of the binder composition with the glass fibers.

9. In a product formed of glass fibers and a cured binder, wherein the glass fibers are bonded together by said cured binder in a random arrangement to form a substantially rigid structure and wherein the cured binder results from heating together on the glass fiber surface a mixture of resinous material, lubricant, silane, ammonium salt of a strong acid and water, the improvement comprising using a terpolymer as the resinous material in the binder, wherein said terpolymer is formed by combining phenol, formaldehyde, dicyandiamide and urea by:

(a) charging a reactor with a mixture of formaldehyde and phenol in a mol ratio of formaldehyde/phenol of from 2.9–3.5/1;
(b) reacting the mixture in the presence of a condensing agent until it has a free formaldehyde content of from 5.0–10.0 percent by weight of the total weight of formaldehyde and phenol and water;
(c) adding to the reactor, dicyandiamide in a mol ratio of phenol/dicyandiamide of substantially 1.0/0.05–0.2, and wherein the mol ratio of free formaldehyde to dicyandiamide is from 5.0–10.1/1.0;
(d) reacting the dicyandiamide and the mixture until the free formaldehyde content has been reduced to from 0.5 to 5.0 percent by weight of the total weight of formaldehyde, phenol, dicyandiamide and water;
(e) adding urea to the reactor in an amount that the mol ratio of phenol/urea is 1.0/0.1–0.4, and wherein the mol ratio of free formaldehyde to urea is from 0.5–5.0/1;
(f) reacting the urea and the mixture until the free formaldehyde content has been reduced to from 0.1–2.0 percent by weight of the total weight of formaldehyde, phenol, dicyandiamide, urea and water;
(g) cooling the reactor contents comprising the polymeric component; and
(h) neutralizing the reactor contents to stop the reactions short of completion;

and wherein the improvement further comprises adding to the binder composition an amount of an unreacted nitrogenous compound sufficient to react with residual formaldehyde in the binder, but insufficient to reside as an excess on the product.

10. The product as claimed in claim 9 wherein the nitrogenous unreacted compound is selected from the group consisting of urea, melamine, dicyandiamide, and combinations thereof.

11. A method of preparing a bonded glass fiber product comprising the steps of:

(a) combining phenol, formaldehyde, dicyandiamide, and urea to form polymeric components of a binder composition, said combining comprising:
  (1) charging a reactor with a mixture of formaldehyde and phenol in a mol ratio of from 2.9–3.5/1;
  (2) reacting the mixture in the presence of a condensing agent until it has a free formaldehyde content of from 5.0 to 10.0 percent by weight of the total weight of formaldehyde, phenol and water;
  (3) adding to the reactor, dicyandiamide in a mol ratio of phenol/dicyandiamide of substantially 1.0/0.5–0.2, and wherein the mol ratio of free formaldehyde to dicyandiamide is from 5.0 to 10.0/1.0;
  (4) reacting the dicyandiamide and the mixture until the free formaldehyde content has been reduced to from 0.5 to 5.0 percent by weight of the total weight of formaldehyde, phenol, dicyandiamide and water;
  (5) adding urea to the reactor in a mol ratio of phenol/urea of substantially 1/0.1–0.4, and wherein the mol ratio of free formaldehyde to urea is from 0.5 to 5.0/1;
  (6) reacting the urea and the reactor contents until the free formaldehyde content has been reduced to from 0.1 to 2.0 percent by weight of the total weight of formaldehyde, phenol, dicyandiamide, urea, and water;
  (7) cooling the reactor contents; and
  (8) neutralizing the reactor contents to stop the reactions short of completion;
(b) adding a lubricant, a silane, an ammonium salt of a strong acid, and water to the polymeric components to make up a binder composition;
(c) combining the binder composition with glass fibers as they are formed from molten streams of glass;
(d) adding to the binder composition prior to said combining of step (c) an amount of an unreacted nitrogenous compound reactive with formaldehyde sufficient to provide flexibility in the properties of the product and further, to reduce pollutants emitting into the atmosphere upon curing of the binder composition;
(e) consolidating the glass fibers and binder composition into a loosely packed mass on a foraminous conveyor;
(f) compressing the loosely packed mass on the foraminous conveyor to obtain a desired density and thickness;
(g) curing the binder composition in situ on the glass fiber product.

12. The product of claim 11 wherein the unreacted nitrogenous compound is selected from the group consisting of urea, melamine, dicyandiamide and combinations thereof.

13. In a method of preparing a bonded glass fiber product comprising the steps of:

(a) combining a binder composition comprising a resinous component, a lubricant, a silane, an ammonium salt of a strong acid, and water, with glass fibers substantially immediately after the glass fibers are formed from molten streams of glass;
(b) consolidating the glass fibers and binder composition into a loosely packed mass on a foraminous conveyor;
(c) compressing the loosely packed mass on the foraminous conveyor to obtain a desired density and thickness; and
(d) curing the binder composition in situ on the glass fiber product;

the improvement comprising combining phenol, formaldehyde, dicyandiamide, and urea to form as the resinous component of the binder composition, a terpolymer, wherein said combining comprises:

(1) charging a reactor with a mixture of formaldehyde and phenol having a mol ratio of from 2.9–3.5/1, and a free formaldehyde content of from 40 to 65 percent by weight of the total weight of formaldehyde and phenol;
(2) adding water to the reactor so that a refractive index of not less than 1.3300 and not more than 1.4400 is obtained;
(3) reacting the reactor contents for 2–4 hours at 100°–120° F., including the time to add a barium hydroxide condensing agent thereto;
(4) adding the barium hydroxide agent to the reactor over the first 1–3 hours of the 100°–120° F. reaction of step (3);
(5) reacting the reactor contents for 30 minutes to 2 hours at 120°–130° F., after the reaction temperature has been raised from 100°–120° F. over a 30 minute to 1 hour time span;
(6) reacting the reactor contents for approximately 2–4 hours at 135°–150° F., after the reaction temperature has been raised from 120°–130° F. over a 30 minute to 1 hour time span, until the free formaldehyde content has been reduced to from 5–10 percent by weight;
(7) adding dicyandiamide to the reactor over a 30 minute to 1 hour period, wherein the free formaldehyde to dicyandiamide mol ratio ranges from 5.0/1 to 10.0/1;

(8) reacting the dicyandiamide with the free formaldehyde for approximately 30 minutes to 1 hour at 135°–150° F.;

(9) adding urea to the reactor over a 30 minute to 1 hour period wherein the free formaldehyde to urea mol ratio ranges from 0.5 to 5.0;

(10) cooling the reactor contents to at least 100° F., sufficient to allow the urea and free formaldehyde to react partially; and

(11) neutralizing the reactor contents with dilute sulfuric acid to a pH of preferably from 7.1 to 7.3, and wherein the improvement further comprises adding to the binder composition prior to said combining of the binder composition with the glass fibers, an amount of an unreacted nitrogenous compound sufficient to react with residual formaldehyde from the terpolymer to reduce pollutants emitting into the atmosphere during the curing of the binder composition.

14. The product of claim 13 wherein the unreacted nitrogenous compound is selected from the group consisting of urea, melamine, dicyandiamide, and combinations thereof.

References Cited
UNITED STATES PATENTS

| | | | |
|---|---|---|---|
| 3,223,668 | 12/1965 | Stalego | 117—126 GB |
| 3,336,185 | 8/1967 | Helbing | 117—126 GB |

WILLIAM D. MARTIN, Primary Examiner

D. COHEN, Assistant Examiner

U.S. Cl. X.R.

117—126 GB; 260—29.3, 29.4, 51.5